(12) United States Patent
Rathor et al.

(10) Patent No.: US 12,483,911 B2
(45) Date of Patent: Nov. 25, 2025

(54) BACKGROUND EVENT BASED CAPTURING IN NETWORK

(71) Applicant: Rakuten Symphony, Inc., Tokyo (JP)

(72) Inventors: Sandeep Rathor, Indore (IN); Arpit Gangwal, Indore (IN); Rahul Bais, Indore (IN); Rashi Verma, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/908,388

(22) PCT Filed: Aug. 3, 2022

(86) PCT No.: PCT/US2022/039253
§ 371 (c)(1),
(2) Date: Aug. 31, 2022

(87) PCT Pub. No.: WO2024/030124
PCT Pub. Date: Feb. 8, 2024

(65) Prior Publication Data
US 2024/0196237 A1    Jun. 13, 2024

(51) Int. Cl.
*H04W 24/06* (2009.01)
*H04W 24/10* (2009.01)
(52) U.S. Cl.
CPC ........... *H04W 24/06* (2013.01); *H04W 24/10* (2013.01)
(58) Field of Classification Search
CPC ..... H04W 24/06; H04W 24/10; H04W 24/08; H04W 24/02; G01S 5/02525
See application file for complete search history.

(56) References Cited

U.S. PATENT DOCUMENTS

2009/0011779 A1* 1/2009 MacNaughtan ...... H04W 64/00
455/456.6
2012/0253548 A1* 10/2012 Davidson ......... G06Q 10/06398
701/1

(Continued)

OTHER PUBLICATIONS

Written Opinion of the International Searching Authority dated Nov. 1, 2022 in International Application No. PCT/US22/39253.

(Continued)

*Primary Examiner* — Sudesh M. Patidar
(74) *Attorney, Agent, or Firm* — Sughrue Mion, PLLC

(57) ABSTRACT

An apparatus for performing walk testing of radio network performance is provided. The apparatus includes at least one processor configured to execute to instructions to: based on a first user input to a first location on an area map displayed by the application, determine first coordinates of the first location on the area map and capture Radio Frequency (RF) data of a start point of interest; automatically capture RF data of at least one secondary point of interest; based on a second user input to a second location on the displayed area map, determine second coordinates of the second location and capture RF data of a stop point of interest; determine a number and coordinates of secondary points of interest to be displayed based on a number of automatically captured RF data samples; and allocate the automatically captured RF data samples to the secondary points of interest to be displayed.

19 Claims, 6 Drawing Sheets

(56) References Cited

U.S. PATENT DOCUMENTS

| | | | |
|---|---|---|---|
| 2013/0114446 A1* | 5/2013 | Liu | H04W 24/10 |
| | | | 370/252 |
| 2014/0221021 A1 | 8/2014 | Zazula | |
| 2014/0335894 A1* | 11/2014 | Wirola | H04W 4/029 |
| | | | 455/456.1 |
| 2018/0211179 A1* | 7/2018 | Dzierwa | H04B 17/391 |
| 2020/0013275 A1* | 1/2020 | Malinofsky | G08B 21/24 |
| 2020/0163044 A1 | 5/2020 | Bapat et al. | |
| 2021/0176353 A1* | 6/2021 | Labrie | H04W 24/06 |
| 2022/0227388 A1* | 7/2022 | Mei | H04W 4/02 |

OTHER PUBLICATIONS

International Search Report dated Nov. 1, 2022 in International Application No. PCT/US22/39253.

\* cited by examiner

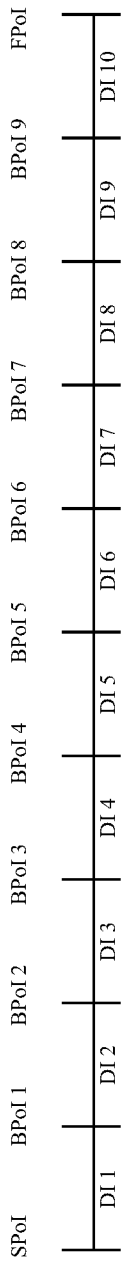

FIG. 4

SPoI  BPoI1  BPoI2  BPoI3  BPoI4  BPoI5  BPoI6  BPoI7  BPoI8  BPoI9  FPoI
   DI1   DI2   DI3   DI4   DI5   DI6   DI7   DI8   DI9   DI10

No. of secondary points of interest (BPoI) = 9
No. of distance intervals = NDI = NBPoI + 1 = 10

X, Y Coordinates of SPoI: X1 = 500; Y1=200
X, Y Coordinates of FPoI: X2 = 650; Y2 = 620

EVAL CALC (Step S301)
TD = SQRT (((ABS (X2 – X1) *ABS (X2 – X1)) + ((ABS (Y2 – Y1) *ABS (Y2 – Y1))) = 600.750
DI = TD / (NBPoI + 1) = TD / NDI = 60.075
One distance interval has a length of 60.077;

EVAL CALC (Step S302)
Minimum distance interval MDI = 35;

MDI < DI:
ALLOC CALC (StepS303)
Total distance = TD = (NBPoI + 1) * DI = 10* 60.075 = 600.750

FIG. 5

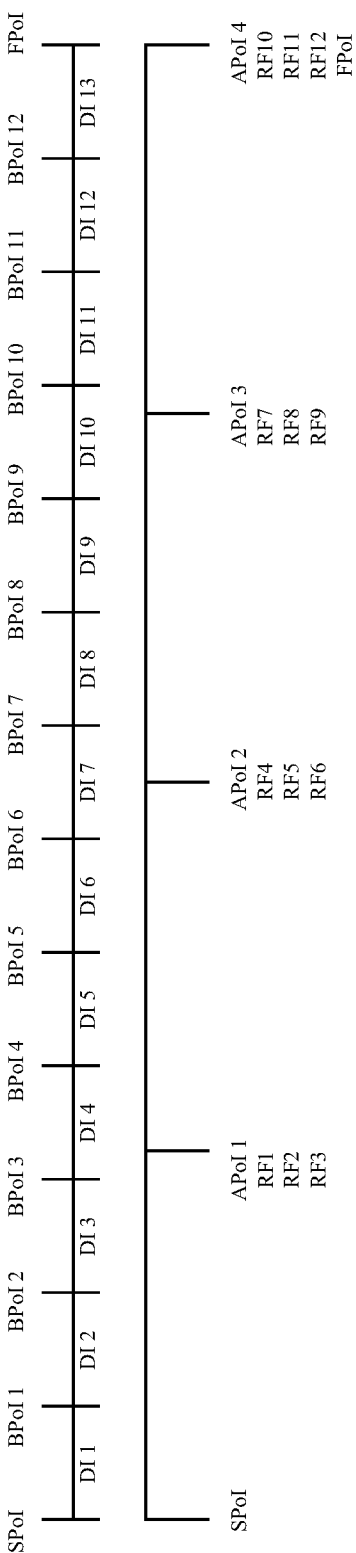

INITIAL CALC
NBPoI = 12
NDI = NBPoI + 1 = 13
NTPoI = NBPoI + SPoI + FPoI = NDI + 1 = 14

EVAL CALC
TD = SQRT (((ABS (X2 − X1) *ABS (X2 − X1)) + ((ABS (Y2 − Y1) *ABS (Y2 − Y1))) = 160
DI = TD / (NBPoI + 1) = TD / NDI = 12

EVAL CALC
MDI = 35
MDI < DI:

AUX CALC
NAPoI = NDI = INTEGER (TD / MDI) = 160/35 = 4;
Number of secondary points to be displayed: NAPoI − 1 = 3
ADI = MDI + (Remaining Distance Interval (RDI)/NDI)
RDI = TD − (NDI * MDI) = 160 − (4*35) = 20

ALLOC CALC
ADI = MDI + (RDI/NDI) = 35 + 5 = 40
BF = NBPoI/ NAPoI = 12/4 = 3

CAPTURE CALC
X, Y Coordinates of SPoI: X1 ; Y1
X, Y Coordinates of FPoI: X2 ; Y2

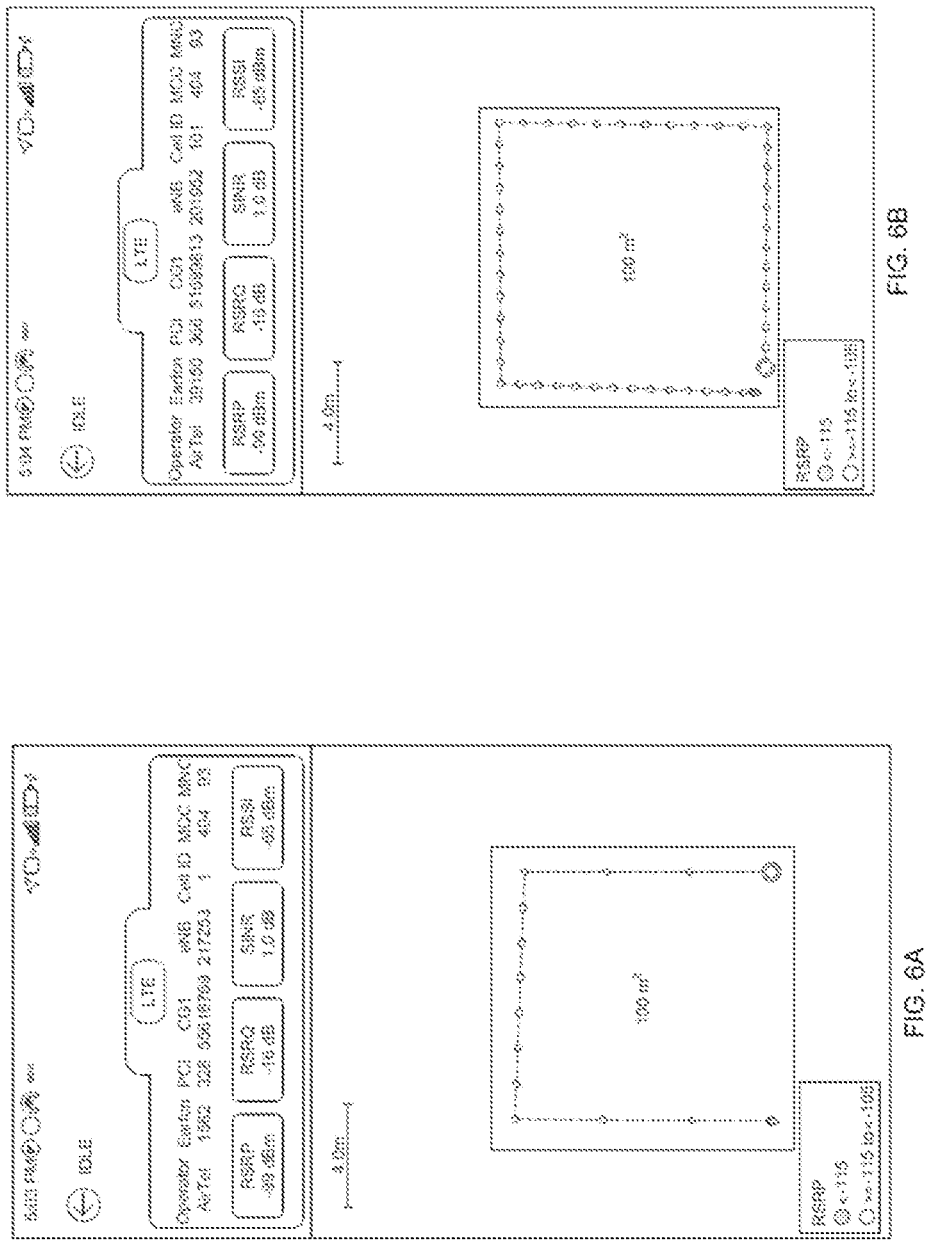

BACKGROUND EVENT BASED CAPTURING IN NETWORK

This application is a National Stage of International Application No. PCT/US2022/039253 filed Aug. 3, 2022.

FIELD

Apparatuses and methods consistent with example embodiments of the present disclosure relate to automated walk tests in radio frequency (RF) walk testing systems, and in particular to automated walk test operation of such RF walk testing systems.

BACKGROUND

Traditional walk testing systems comprise an RF network analyzer for the measurement of a radio link and parameters providing information about the quality of the wireless network, etc. Moreover, such walk testing systems comprise a database to log the position and the measurement results in order to provide an RF-engineer with results of the walk testing in relation to an area under test, such as a floorplan, an aerial plan, etc. Usually, the data logging is performed manually by an RF-engineer who is predetermining a grid of points of interest in the area under test and aligning the grid to the area. This grid divides the area into a plurality of points of interest. Each grid point provides the location of a point of interest to be tested in relation to the area map. The grid points determine the resolution of the walk testing in the area under test.

The problems of such traditional systems is that the bigger the area, the more grid points are needed for an accurate test of the radio network quality, and the more difficult and time consuming it gets to accurately align a grid to the area under test. Moreover, this traditional way of operating a walk test is cumbersome and expensive since measurement hardware such as an RF network analyzer and a monitoring system are necessary to perform the walk testing. Further, based on the predetermined grid of traditional walk testing systems, it is difficult to perform a walk test in areas such as offices and manufacturing sites once such areas have been furnished.

In order to overcome such problems, indoor walk testing software apps for mobile devices are applied. A related art walk testing software app can be executed by mobile devices (e.g., smart phones, tablet computers, etc.) connected to a radio network under test. The walk testing software application (app) can measure and/or capture various RF data of the radio network within an indoor environment.

Specifically, such a walk testing software app allows users, for example, RF-engineers of mobile operators, to import floorplan data of an indoor environment to be tested. The floorplans can be imported by, for example, taking a picture of the floorplan layout with a camera of a smart phone or by importing data of the floorplan layout into the walk testing software app.

The walk testing software app matches or maps the floorplan to a coordinate system. After matching the floorplan to the coordinate system, the user can select a starting point for the walk test in the floorplan as depicted on the display of the mobile device, such as a touch screen of a smart phone, etc. The start point is represented by, for example, a pin on the area map on the display and a test of the radio network, for example a radio access network (RAN), is performed from this point onwards by a manual walk testing and selection of points.

The user can select points of interest on the floorplan layout displayed on the display by repeatedly pressing an input key on the mobile device or, for example, touching the touchscreen of the smart phone to select such point of interest. The manual selection of a point of interest by keystroke or touching is called a pin-push operation. A pin refers to the selected point of interest and marks the representation of this point of interest which is depicted on the floorplan layout displayed on the screen of the mobile device. For each pin-push operation to select a point of interest, the software app performs a test (e.g., RF key performance indicator (KPI) capture or measurement). Thus, it is possible to capture RF data and map to the corresponding push-pin created or input on the displayed floorplan layout.

As set forth above, the related art walk testing system requires manual creation or selection of push-pins for capturing RF data (e.g., KPI measurements). This means for an accurate measurement, the user of the walk testing software app must repeatedly perform a manual push-pin operation precisely on the corresponding location of the displayed floorplan. This can be cumbersome and inconvenient for an RF-engineer and costly for the mobile operator or the service provider. Furthermore, because the selection of points of interest requires a manual push-pin operation in the related art, the walk test is vulnerable to human error, e.g., an RF engineer inadvertently omitting a push-pin or inadvertently selecting a location on the displayed floorplan that does not accurately correspond to an actual location of the point of interest at which the RF data is captured.

SUMMARY

According to embodiments, systems and methods are provided for automated walk testing operations in RF walk testing systems, which automatically capture network performance data without requiring repeated manual operation.

According to embodiments, an apparatus for implementing an application for walk testing of radio network performance includes a display, a radio network transceiver interface, a memory storing instructions and at least one processor configured to execute to the instructions to: based on a first user input to a first location on an area map displayed by the application, determine first coordinates of the first location on the area map and capturing RF data of a start point of interest corresponding to the first location; automatically capture RF data of at least one secondary point of interest; based on a second user input to a second location on the displayed area map, determine second coordinates of the second location on the area map and capture RF data of a stop point of interest corresponding to the second location; determine a number of secondary points of interest to be displayed on the area map and coordinates of the secondary points of interest to be displayed on the area map based on a number of automatically captured RF data samples and based on the determined first coordinates and the determined second coordinates; locate the automatically captured RF data samples to the secondary points of interest to be displayed based on the determined number of the secondary points of interests to be displayed; and display the secondary points of interest at the determined coordinates on the area map.

The at least one processor may be further configured to execute to the instructions to: determine a total distance between the first coordinates and the second coordinates; determine a number of distance intervals between the first coordinates and the second coordinates based on the number of the automatically captured RF samples; evaluate the determined total distance and the number of distance intervals based on a predetermined minimum distance interval between points of interest; and determine the number of secondary points of interest to be displayed and the coordinates of the secondary points of interest to be displayed based on the evaluating.

The at least one processor may be further configured to: obtain a quotient of the determined total distance and the number of determined distance intervals; and compare the obtained quotient to the predetermined minimum distance interval.

The at least one processor may be further configured to: determine that the number of secondary points of interest is equal to the number of automatically captured RF samples based on the predetermined minimum distance interval being less than the obtained quotient, according to the comparing.

The at least one processor may be further configured to: determine that the number of secondary points of interest is less than the number of automatically captured RF samples based on the predetermined minimum distance interval being greater than or equal to the obtained quotient, according to the comparing.

The at least one processor may be further configured to: based on the predetermined minimum distance interval being greater than or equal to the obtained quotient, determining the number of secondary points of interest to be displayed to be equal to X−1, wherein X is an integer corresponding to a quotient of the determined total distance and the predetermined minimum distance interval.

The at least one processor may be further configured to, based on the predetermined minimum distance interval being greater than or equal to the obtained quotient: determine a distance between adjacent points of interest to be displayed; and determine the coordinates of the secondary points of interest to be displayed according to the first coordinates, the second coordinates, and the determined distance between adjacent points of interest to be displayed.

The determined distance between the adjacent points of interest to be displayed may be equal to: $Y+((Z-(X*Y))/X)$, where X is an integer corresponding to a quotient of the determined total distance and the predetermined minimum distance interval, Y is the predetermined minimum distance interval, and Z is the determined total distance.

The at least one processor may be further configured to, based on the determined number of the secondary points of interests to be displayed being less than the number of automatically captured RF data samples: combine N number of successive automatically captured RF data samples to be allocated to each of the secondary points of interest to be displayed; and N is equal to an integer corresponding to a quotient of A and B, where A is the number of automatically captured RF data samples and B is equal to 1 plus the determined number of secondary points of interest to be displayed.

According to embodiments, a method for implementing an application for walk testing of radio network performance, includes: based on a first user input to a first location on an area map displayed by the application, determining first coordinates of the first location on the area map and capturing RF data of a start point of interest corresponding to the first location; automatically capturing RF data of at least one secondary point of interest; based on a second user input to a second location on the displayed area map, determining second coordinates of the second location on the area map and capturing RF data of a stop point of interest corresponding to the second location; determining a number of secondary points of interest to be displayed on the area map and coordinates of the secondary points of interest to be displayed on the area map based on a number of automatically captured RF data samples and based on the determined first coordinates and the determined second coordinates; locating the automatically captured RF data samples to the secondary points of interest to be displayed based on the determined number of the secondary points of interests to be displayed; and displaying the secondary points of interest at the determined coordinates on the area map.

The determining the number of secondary points of interest may include: determining a total distance between the first coordinates and the second coordinates; determining a number of distance intervals between the first coordinates and the second coordinates based on the number of the automatically captured RF samples; evaluating the determined total distance and the number of distance intervals based on a predetermined minimum distance interval between points of interest; and determining the number of secondary points of interest to be displayed and the coordinates of the secondary points of interest to be displayed based on the evaluating.

The evaluating may include: obtaining a quotient of the determined total distance and the number of determined distance intervals; and comparing the obtained quotient to the predetermined minimum distance interval.

The determining the number of secondary points of interest may include: determining that the number of secondary points of interest is equal to the number of automatically captured RF samples based on the predetermined minimum distance interval being less than the obtained quotient, according to the comparing.

The determining the number of secondary points of interest may include: determining that the number of secondary points of interest is less than the number of automatically captured RF samples based on the predetermined minimum distance interval being greater than or equal to the obtained quotient, according to the comparing.

The determining the number of secondary points of interest to be displayed based on the evaluating may include: based on the predetermined minimum distance interval being greater than or equal to the obtained quotient, determining the number of secondary points of interest to be displayed to be equal to X−1, wherein X is an integer corresponding to a quotient of the determined total distance and the predetermined minimum distance interval.

The determining the coordinates of the secondary points of interest to be displayed may include, based on the predetermined minimum distance interval being greater than or equal to the obtained quotient: determining a distance between adjacent points of interest to be displayed; and determining the coordinates of the secondary points of interest to be displayed according to the first coordinates, the second coordinates, and the determined distance between adjacent points of interest to be displayed.

The determined distance between the adjacent points of interest to be displayed may be equal to: $Y+((Z-(X*Y))/X)$, where X is an integer corresponding to a quotient of the determined total distance and the predetermined minimum distance interval, Y is the predetermined minimum distance interval, and Z is the determined total distance.

The allocating the automatically captured RF data samples to the secondary points of interest to be displayed may include, based on the determined number of the secondary points of interests to be displayed being less than the number of automatically captured RF data samples, combining N number of successive automatically captured RF data samples to be allocated to each of the secondary points of interest to be displayed; and N is equal to an integer corresponding to a quotient of A and B, where A is the number of automatically captured RF data samples and B is equal to 1 plus the determined number of secondary points of interest to be displayed.

According to embodiments, a non-transitory computer readable recording medium has recorded thereon instructions executable by at least one processor to perform a method for performing a walking test, the method including: based on a first user input to a first location on an area map displayed by the application, determining first coordinates of the first location on the area map and capturing RF data of a start point of interest corresponding to the first location; automatically capturing RF data of at least one secondary point of interest; based on a second user input to a second location on the displayed area map, determining second coordinates of the second location on the area map and capturing RF data of a stop point of interest corresponding to the second location; determining a number of secondary points of interest to be displayed on the area map and coordinates of the secondary points of interest to be displayed on the area map based on a number of automatically captured RF data samples and based on the determined first coordinates and the determined second coordinates; locating the automatically captured RF data samples to the secondary points of interest to be displayed based on the determined number of the secondary points of interests to be displayed; and displaying the secondary points of interest at the determined coordinates on the area map.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 4 illustrates an example of a walk test workflow performed according to an embodiment;

FIG. 5 illustrates an example of walk test workflow with averaging and distribution according to an embodiment; and FIGS. 6A and 6B illustrate graphic walk test representation of an example of walk testing workflow with averaging and distribution, according to an embodiment.

DETAILED DESCRIPTION

Figure 1:
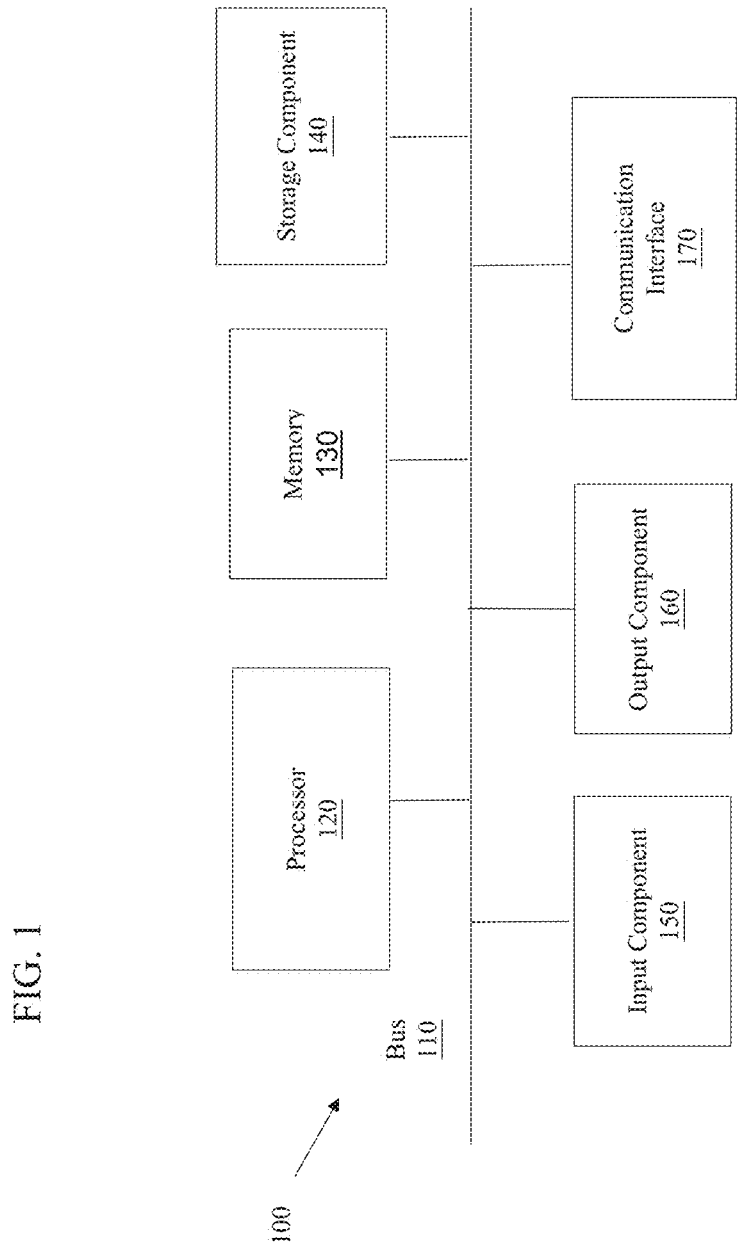
FIG. 1 is a diagram of example components of a device according to an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method, an apparatus and a non-transitory computer readable recording medium in which points of interest for an RF walk test are defined automatically by triggering a generation of secondary points of interest in between a start and an end point of interest. As a result, user burden and the potential for human error resulting from the repeated manual creation of push-pins in the related art are eliminated, and accuracy of the walk test improves.

FIG. 1 is a diagram of example components of a device 100. As shown in FIG. 1, device 100 may include a bus 110, a processor 120, a memory 130, a storage component 140, an input component 150, an output component 160, and a communication interface 170.

Bus 110 includes a component that permits communication among the components of device 100. Processor 120 may be implemented in hardware, firmware, or a combination of hardware and software. Processor 120 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 120 includes one or more processors capable of being programmed to perform a function. Memory 130 includes a random access memory (RAM), a read only memory (ROM), and/or another type of dynamic or static storage device (e.g., a flash memory, a magnetic memory, and/or an optical memory) that stores information and/or instructions for use by processor 120.

Storage component 140 stores information and/or software related to the operation and use of device 1100. For example, storage component 140 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 150 includes a component that permits device 100 to receive information, such as via user input (e.g., a touch screen display, a keyboard, a keypad, a mouse, a button, a switch, and/or a microphone). Additionally, or alternatively, input component 150 may include a sensor for sensing information (e.g., a global positioning system (GPS) component, an accelerometer, a gyroscope, and/or an actuator). Output component 160 includes a component that provides output information from device 100 (e.g., a display, a speaker, and/or one or more light-emitting diodes (LEDs)).

Communication interface 170 includes a transceiver-like component (e.g., a transceiver and/or a separate receiver and transmitter) that enables device 100 to communicate with other devices, such as via a wired connection, a wireless connection, or a combination of wired and wireless connections. Communication interface 170 may permit device 100 to receive information from another device and/or provide information to another device. For example, communication interface 170 may include an Ethernet interface, an optical interface, a coaxial interface, an infrared interface, a radio frequency (RF) interface, a universal serial bus (USB) interface, a Wi-Fi interface, a cellular network interface, or the like.

Device 100 may perform one or more processes described herein. Device 100 may perform these processes in response to processor 120 executing software instructions stored by a non-transitory computer-readable medium, such as memory 130 and/or storage component 140. A computer-readable medium is defined herein as a non-transitory memory device. A memory device includes memory space within a single physical storage device or memory space spread across multiple physical storage devices.

Software instructions may be read into memory 130 and/or storage component 140 from another computer-readable medium or from another device via communication interface 170. When executed, software instructions stored in memory 130 and/or storage component 140 may cause processor 120 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 1 are provided as an example. In practice, device 100 may include additional components, fewer components, different components, or differently arranged components than those shown in FIG. 1. Additionally, or alternatively, a set of components (e.g., one or more components) of device 100 may perform one or more functions described as being performed by another set of components of device 100.

In embodiments, any one of the operations or processes of FIGS. 2-5, 6A, and 6B may be implemented by or using any one of the elements illustrated in FIG. 1.

Figure 2:
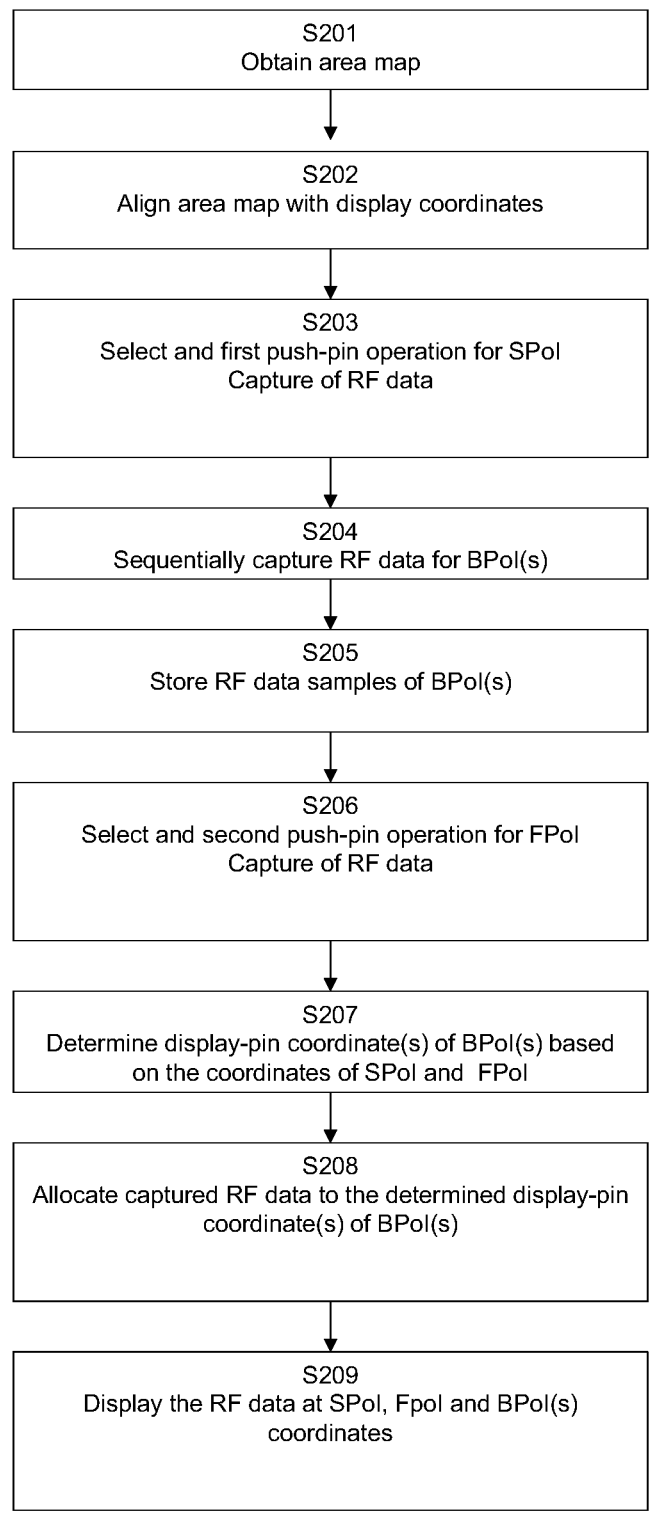
FIG. 2 shows a flowchart of a method of performing a walk test according to an embodiment.

FIG. 2 shows a flowchart of a method of performing a walk test according to an embodiment. The method may be implemented by at least one processor executing instructions. For example, the method may be performed by a walk testing application installed on a walk testing device (e.g., a mobile device, such as a smart phone or a dedicated walk testing device). The walk testing application includes a set of instructions stored on at least one non-transitory computer-readable recording medium and executable by at least one processor (e.g., of the device 100 of FIG. 1).

Referring to FIG. 2, in step S201, a map of an area (e.g., floorplan) in which a walk test is to be performed is obtained. Such an area map can be a schematic depiction of an indoor environment including objects within that environment. For example, the area map may be an office floorplan including furniture and office equipment items such as copiers, shelfs, desks, chairs, etc. The area map may also include particular features for orientation when walking in the area, for example, floor separations such as office cubical, meetings rooms, etc. The area map may further include, for example, structural features such as walls and staircases, utility spaces, elevators, etc. The orientation features in the area map may include at least one of a top view photo or any otherwise created depictions of an area depicting all kinds of objects and features in said area that can be used for orientation. The area map may be obtained by a file transfer, an image capturing, a manual or drawing input, etc. If no orientation features are in an area map, a user may use a grid or the corners of the area map as orientation features as a reference for selecting points of interest in the area map.

In step S202, a coordinate system for the area map is determined. Specifically, an internal coordinate system is mapped or aligned to the obtained area map. The coordinate system may be a pixel coordinate system based on a pixel resolution of a display of the device in which the method is implemented. That is, the pixel resolution of the device display may determine the transformation of physical distances into pixel distances. Based on the alignment of the area map to an internal coordinate system, a user may perform a walk testing in the area.

In step S203, the user commences RF data (i.e., network performance data or KPIs) capturing for the walk testing by a first push-pin operation to select a start point of interest (SPoI). That is, the capturing of RF data (e.g., at least one of Reference Signal Received Power (RSRP), Reference Signal Received Quality (RSRQ), Signal to Interference and Noise Ratio (SINR), Reference Signal Strength Indication (RSSI), etc.) for a particular network (e.g., RAN) under test in accordance with example embodiments is initiated by a user manually selecting or inputting a first point of interest on the area map displayed on the mobile device. This input corresponds to a first push-pin (i.e., representation of location of first or start point of interest (SPoI)) for the automated walk testing operation. In step S203, based on a first user input to a first location on an area map displayed by the application, the walking test app determines first coordinates of the first location on the area map and capturing RF data of a start point of interest corresponding to the first location. The internal coordinates of the start point of interest (SPoI) are obtained relative to the aligned area map. The internal coordinates are used for determining coordinates of other points of interest of the walk test, and for displaying a representation (e.g., push-pin) of the start point of interest (SPoI) in the area map on a display screen. The capture of coordinates in step S203 may include, for example, calculation of transformation and factorization between different coordinate systems to transform coordinates into an appropriate format to display such coordinate data on a display device. The coordinates can be optionally stored in a memory storage. The memory storage is, for example, at least one of a memory 130 or a storage component 140 of the device 100 shown in FIG. 1.

The internal coordinates may be Cartesian coordinates (X, Y) of a 2-dimensional area map or, for example, a 2-dimensional pixel map aligned with a depiction of the area map.

The internal coordinates system or internal coordinates refer to coordinate data used in the walk testing software app, for example, to capture the location of at least a point of interest or, for example, to determine the distance between points of interest in reference to coordinates of orientation features of an area under test.

Moreover, the internal coordinates system or internal coordinates refer to coordinate data used in the walk testing software app, for example, to determine at least one of the locations of representations (e.g., push-pin) of points of interest in an area map as displayed on a display device, to determine the distance in between representations of points of interest, or to determine spacial distribution of such representations of the points of interest or their bundling in the area map as displayed on a display device.

Based on the start point of interest (SPoI) in step S204, an automated capturing process of RF data for secondary points of interest (BPoI) (i.e., sequential capturing of samples of RF data) is initiated. The automated capturing process is a process in which secondary points of interest (BPoI) following the start point of interest (SPoI) are generated (i.e., RF data samples are automatically captured).

In step S204, the walk testing software app triggers the generation of at least one secondary points of interest (BPoI) by time. This means that the RF data of the at least one secondary points of interest (BPoI) are captured in predetermined time periods (e.g., capture one RF data sample every second). The duration of the time periods may be set by the user (e.g., within a predetermined range) or may be predetermined as a default parameter. The time trigger may be set, for example, to time periods between 1 to 10 seconds. The user may move from one point of interest to another along a walking path to generate at least one secondary point of interest (BPoI). Depending on the walking speed of the user and the time period setting, the test software app generates a lower or a higher density of secondary points of interest, for example, shorter or larger distances between secondary points of interest, along the walking path of the user in the area map.

In step S205, the sequentially captured RF data of the secondary points of interest (BPoI) are stored in a memory storage for further processing.

In step S206, based on a second user input to a second location on the displayed area map, the walk testing software app determines second coordinates of the second location on the area map and captures RF data of a stop point of interest corresponding to the second location. The second push-pin operation is also a manual selection of a location of a point of interest in the area map as displayed by the walk testing software app. For example, the user may determine the location of the stop point of interest (FPoI) on the area map based on an orientation feature corresponding to or indicative of a user's actual location in the indoor environment.

In response to the manual selection of the stop point of interest (FPoI) in step S206, a final RF data sample is captured and the automated generating of secondary points of interest (BPoI) (i.e., automated capturing of RF data) stops.

In step S206, internal coordinates of the stop point of interest (FPoI) input to the displayed area map are obtained. The internal coordinates are used for determining coordinates of other points of interest (i.e., the secondary points of interest (BPoI)) of the walk test, and for displaying a representation (e.g., push-pin) of the stop point of interest (FPoI) in the area map on a display. The capture of coordinates, in step S206, is similar to the capture of coordinates in step S203 as explained above. The coordinates optionally can be stored in a memory storage.

In step 207, the number and the coordinates for the at least one secondary point of interest (BPoI) to be displayed are determined based on the number of RF data samples taken during the automated generating of secondary point(s) of interest (BPoI) in step S205 (i.e., the automated capturing of RF data) and based on the first coordinates and second coordinates captured (i.e., determined) in steps S203 and S206. The distance between the first coordinates and second coordinates is called the total distance between the start point of interest (SPoI) and the stop point of interest (FpoI). The coordinates of the secondary point(s) of interest (BPoI) to be displayed are coordinates of the graphical representation of secondary point(s) of interest (BPoI) to be displayed in the area map on the display screen.

The number of secondary point(s) of interest (BPoI) to be displayed may be determined to be smaller than the number of automatically captured RF data samples in consideration of the pixel resolution of the display. In other words, the number of secondary point(s) of interest to be displayed may be less than the number of secondary point(s) of interest automatically generated in step S205. In this case, the graphic representation of each secondary point of interest (BPoI) to be displayed may correspond to more than one automatically captured RF data sample. Where the number of secondary points of interest to be displayed is less than the number of automatically captured RF data samples, a number of automatically captured RF data samples may be bundled (e.g., averaged) into each secondary point of interest to be displayed, and the coordinates for the bundled secondary point of interest (BPoI) to be displayed may be determined accordingly.

In step 208, the automatically captured RF data samples stored in step S205 are allocated to the corresponding secondary point(s) of interest BPoI(s) to be displayed. If the number of secondary points of interest to be displayed (in step 209) is equal to the number of RF data samples, each stored RF data sample is allocated to a corresponding secondary point of interest (BPoI) to be displayed. If the number of secondary point(s) of interest BPoI(s) to be displayed is less than the number of automatically captured RF data samples, the allocation may include an averaging process of the RF data samples based on the number of bundled secondary point of interest (BPoI) to be displayed.

In particular, in step S207, the walk testing software app or the walk testing device evaluates whether the total number of automatically captured RF data samples can be displayed as secondary points of interest (BPoI) on the display screen of the walk testing device based on a minimum distance interval between two adjacent points of interest (MDI). This minimum distance interval between two adjacent points of interest (MDI), for example, may also be a minimum pixel distance (MPD) that allows a graphical representation of the point of interest to be clearly distinguishable from an adjacent graphical representation of another point of interest on the display. The minimum distance interval between two adjacent points of interest (MDI) and minimum pixel distance (MPD) may be used interchangeably based on the internal coordinate data format (i.e., based on each coordinate in the coordinate system corresponding to a pixel of the display's pixel resolution). The MDI and/or the MPD may be predetermined and/or may be determined or calculated based on a pixel resolution of a display of the walk testing device.

For the evaluation, in step S207, the number of distance intervals (NDI) created by the number of automatically captured RF data samples between the first coordinate of the start point of interest (SPoI) and the time of the second coordinate of the stop point of interest (FPoI) is determined.

For example, if the number of automatically captured RF data samples (i.e., the number of automatically generated secondary points of interest) between first coordinate of the start point of interest (SPoI) and the second coordinate of the stop point of interest (FPoI) is 3, then the number of distance intervals created by the automatically generated the secondary points of interest (NDI) is 4. Thus, the number of distance intervals (NDI) in between a start and stop point of interest is always one more than the number of automatically captured RF data based on logic that NDI=NBPoI+1 (where NBPoI here corresponds to the number of automatically generated secondary points of interest/automatically captured RF data).

Figure 3:
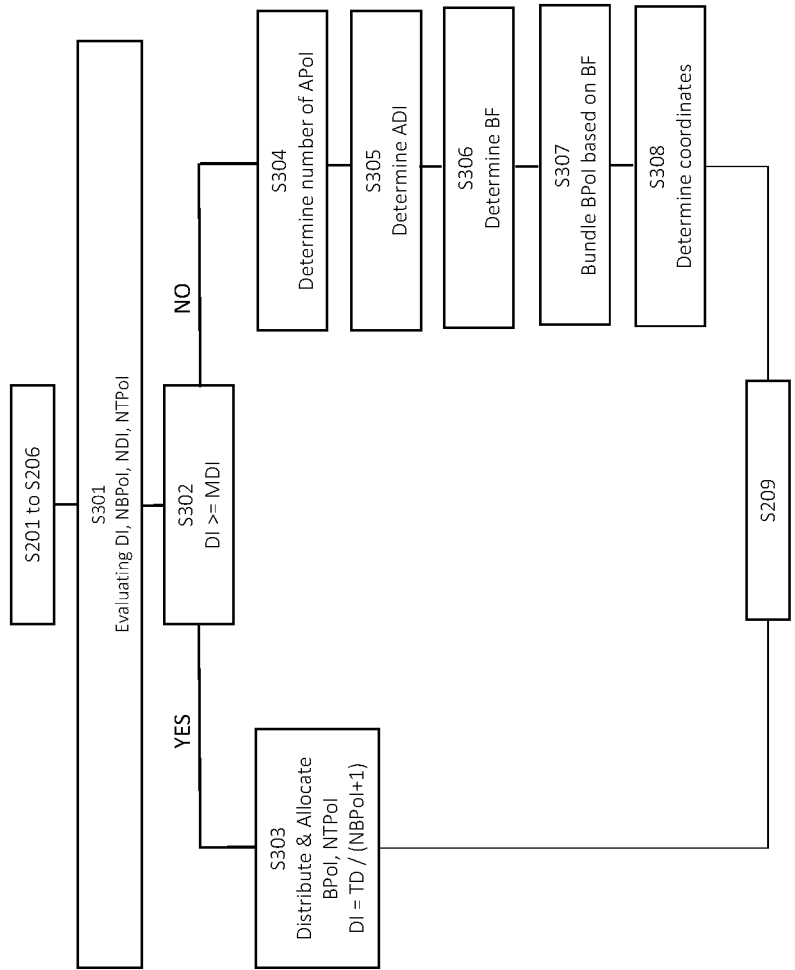
FIG. 3 shows a flowchart of a method of determining secondary points of interest to be displayed based on first coordinates of a start point of interest and second coordinates of a stop point of interest, according to an embodiment.

FIG. 3 shows a flowchart of a method of determining a number of secondary points of interest (BPoI) to be displayed in accordance to step 207 of FIG. 2. Referring to FIG. 3, in step S301, the walk testing software app determines the total distance (TD) between the first location (e.g., first coordinates) of the start point of interest (SPoI) and the second location (e.g., second coordinates) of the stop point of interest (FPoI) based on the coordinates captured in steps 203 and 206, respectively. Based on the determined total distance (TD), the walk testing software app determines the distance interval (DI) that is the quotient of the total distance (TD) and number of distance intervals (NDI), i.e., 1 plus the number of automatically generated secondary points of interest (NBoPI) based on the logic that DI=TD/NDI=TD/(NBPoI+1).

In step S302, the walk testing software app evaluates whether the distance interval (DI) as determined in step S301 is greater than or equal to a predetermined minimum distance interval between two adjacent points of interest (MDI). If this is the case (Yes at S302), then the method proceeds to step S303.

In step S303, the walk testing software app determines coordinate(s) of the at least one secondary point of interest (BPoI) to be displayed based on the total distance (TD) and the number of distance intervals NDI (i.e., 1+ the number of secondary points of interest (NBPoI) to be displayed). The coordinates of the secondary points of interest to be displayed may be aligned in distance intervals (DI) forming, for example, a straight line of graphic representations of secondary points of interest (BPoI) between the first coordinates of the start point of interest (SPoI) and second coordinates of the stop point of interest (FPoI). The distance interval (DI) may be an equidistance interval between any of two adjacent points of interest.

Meanwhile, if the predetermined minimum distance interval (MDI) is greater than the distance interval (DI) (No at S302), the method proceeds to step S304. In this case, the walk testing device is unable to clearly and distinguishably display graphical representations of the number of automatically generated secondary points of interest (BPoI) (i.e., referring to the number of automatically captured RF data samples) due to the pixel resolution of the display. The walk testing software app bundles a plurality of automatically generated secondary points of interest (BPoI) into a number of secondary points of interest (ABPoI) to be displayed after the start point of interest (SPoI) in the area map.

To do that, in step S304, the walk testing software app determines a number of auxiliary points of interest (APoI) into which the automatically generated secondary points of interest (BPoI) will be bundled. As will be explained with reference to FIG. 5, in an example embodiment, the number of auxiliary points of interest is equal to the number of secondary points of interest to be displayed plus 1. This is because, in an example embodiment, some of the automatically generated secondary points of interest are bundled or averaged with the stop point of interest. In an example embodiment, the number of auxiliary points of interest may be determined to be equal to an integer value of a quotient of the total distance (TD) distance interval and the minimum distance interval (MDI). Thus, the number of secondary points of interest to be displayed is equal to that quotient minus 1.

In step 305, an auxiliary distance interval (ADI) of the secondary points of interest to be displayed is determined. The auxiliary distance interval (ADI) is the distance between all points of interest to be displayed, as the points for display will be equidistant from each other. The auxiliary distance interval (ADI) may be determined in accordance with the following equation:

$$Y+((Z-(X*Y))/X), \qquad \text{(Equation 1)}$$

where X is an integer corresponding to a quotient of the determined total distance and the predetermined minimum distance interval, Y is the predetermined minimum distance interval, and Z is the determined total distance. It is understood that one or more other example embodiments are not limited to the above Equation 1, and may be performed using a different equation or a different sequence of equations (e.g., a remaining distance factor $((Z-(X*Y))/X)$ may be calculated for (or further broken down into a series of calculations) and then added to the predetermined minimum distance interval).

In step 306, a bundle factor (BF) is calculated. The bundle factor is a calculation of the number of successive automatically generated secondary points of interest to be accumulated into each secondary point of interest for display (or into each auxiliary point of interest). According to an embodiment, the bundle factor is an integer corresponding to a quotient of A and B, where A is number of automatically captured RF data samples and B is equal to the number of auxiliary points of interest. In an example embodiment, the quotient may be rounded down to a nearest integer value, and any remainder will be bundled (averaged) into a predetermined auxiliary point of interest (e.g., the first auxiliary point of interest, a middle auxiliary point of interest, or the last auxiliary point of interest) or distributed (where the remainder is greater than 1) into a plurality of predetermined auxiliary points of interest. Further, according to an embodiment, the last auxiliary point of interest further bundles (averages) the RF data captured for the stop point of interest (FPoI).

In step S307, the walk testing software app bundles the automatically generated secondary points of interest into the auxiliary points of interest based on the determined bundle factor (BF). In this regard, BF number of successive automatically captured RF data is averaged and allocated to an auxiliary point of interest. As set forth above, the last auxiliary point of interest further bundles the RF data of the stop point of interest (FPoI).

In step S308, the coordinates of the secondary points of interest to be displayed are determined. The coordinates are determined such that each of the points of interest for display are equally spaced apart across the total distance (TD). To this end, the start point of interest (SPoI) is displayed at the first coordinates, the stop of interest (FPoI) is displayed at the second coordinates, and secondary points of interest to be displayed are located on a straight line between the first and the second coordinates and spaced apart equally from each other (i.e., by the auxiliary distance interval).

FIG. 4 illustrates an example of a walk test workflow performed according to an embodiment. The example of FIG. 4 is in accordance with the methods of FIGS. 2 and 3 for the case when a minimum distance interval between two adjacent points of interest (MDI) is less than or equal to a distance interval (DI) of automatically generated secondary points of interest. The distance interval (DI) is the quotient of the total distance (TD) and 1 plus total number automatically generated secondary points of interest (NBPoI) based on the logic that DI=TD/NDI; DI=TD/(NBPoI+1), wherein NBPoI+1=NDI.

In the present example, the number of automatically generated secondary points of interest (NBPoI) is 9. The minimum distance interval (MDI) is predetermined to be 35. The number of distance intervals created by the generated secondary points of interest (NDI) is 10. The total distance (TD) between the start point of interest (SPoI) and the stop point of interest (FPoI) as calculated by the captured coordinates is 600.750. The distance interval (DI) that is the quotient of the total distance (TD) and the number distance intervals is 60.75, which satisfies the condition that the minimum distance interval between two adjacent points of interest (MDI) is less than or equal to the distance interval (DI). In this case, the number of generated secondary points of interest (NBPoI) (i.e., the number of automatically captured RF data samples) is allocated in distance interval (DI) over the total distance (TD) between the start point of interest (SPoI) and the stop point of interest (FPoI). Moreover, the each of the RF data samples is allocated to its respective secondary points of interest (NBPoI) to be displayed. This means, no bundling is needed for displaying the secondary points of interest (NBPoI), i.e., the automatically captured RF data samples in step S209 of FIG. 2.

FIG. 5 illustrates an example of walk testing performed with an allocation according to an embodiment for the case where a minimum distance interval between two point of interest (MDI) is greater than a determined distance interval (DI).

In FIG. 5, the start point of interest (SPoI) and the stop point of interest (FPoI) mark the ends of the sequence of automatically captured RF data samples (i.e., automatically generated secondary points of interest (BPoI)). In the example of FIG. 5, the number of automatically generated secondary points of interest (BPoI), i.e, the number of automatically captured RF data samples, is 12 (NBPoI=12). The predetermined minimum distance interval (MDI) is 35. The number of distance intervals (NDI) in accordance with number of automatically captured RF data samples is 13 (12+1). The total distance (TD) between the start point of interest (SPoI) and the stop point of interest (FPoI) as calculated by the captured coordinates is 160. The distance interval (DI) based on the number of automatically generated secondary points of interest (NBPoI) is equal to the integer quotient of the total distance (TD) and number of distance intervals (NDI). In this case, DI=12, which is less than the minimum distance interval (MDI). As a result, in accordance with example embodiments, automatically generated secondary points of interest (i.e., the automatically captured RF data) is averaged or bundled into auxiliary points of interest (APoI).

In this case, the number of auxiliary points of interest (NAPoI) to be displayed is determined from the integer quotient of the total distance (TD) and the predetermined minimum distance interval (MDI). Here, the quotient is rounded down to the nearest integer. In the present example, the number of auxiliary points of interest (NAPoI) is 4.

The bundle factor (BF) is the quotient of the number of automatically generated secondary points of interest (NBPoI) and the number of auxiliary points of interest (NAPoI) to be displayed. In the present example, the bundle factor (BF) is equal to 3 (12/4). Thus, three successive automatically generated secondary points of interest (BPoI 1, BPoI 2, BPoI 3) corresponding to automatically captured RF data samples (RF1, RF2, RF3) are accumulated (averaged) into one auxiliary point of interest (APoI1). The next three automatically generated secondary points of interest (BPoI 4, BPoI 5, BPoI 6) are accumulated to the next auxiliary point of interest (APoI2), etc. The last three automatically generated secondary points of interest (BPoI 10, BPoI 11, BPoI 12) are averaged with the stop point of interest (FPoI) in order to generate the final auxiliary point of interest (APoI 4).

In the example of FIG. 5, the first three auxiliary points of interest (APoI 1, APOI 2, APoI 3) are output as the secondary points of interest for display, and are located between the first coordinates of the start point of interest and the second coordinates of the stop point of interest. The distance between each of the three secondary points of interest to be displayed (APOI 1, APOI 2, APoI 3) is the auxiliary distance ADI as determined in step 307, respectively. In fact, the distance between all of the points of interest to be displayed is equal to the ADI. For example, in FIG. 5, the ADI is determined as 35+((160−(INT(160/35)*35))/INT(160/35)) =40. Further, in the example of FIG. 5, the last auxiliary point of interest (APoI 4) is output as the stop point of interest (FPoI).

In FIG. 5, the allocation of the automatically captured RF data samples to the secondary points of interest to be displayed is a follows. The walking test app, in this example combines 3 successive automatically captured RF data samples to be allocated to each of the secondary points of interest to be displayed, whereas 3 refers to the bundle factor (BF) and is equal to an integer corresponding to a quotient of A and B, where A is the number of automatically captured RF data samples and B is equal to 1 plus the determined number of secondary points of interest to be displayed (i.e., equal to the number of auxiliary points of interest).

FIGS. 6A and 6B show a sequence of points of interest (PoI) in which the start point of interest is a corner (SPoI) point of an non-furniture floorplan. FIGS. 6A and 6B illustrate an example of a display of points of interest per a walk test performed in accordance with example embodiments.

FIG. 6A a shows a stop point of interest (FPoI) in the another corner than that of start point of interest (SPoI). The sequences of points of interest (PoI) generated along a walking route parallel to the four walls of the floorplan covering the outline of the floorplan. The number of secondary points of interest and the distance interval are depending on the user walking speed and the trigger time period.

FIG. 6B shows a stop point of interest (FPoI) in the same corner close to the start point of interest (SPoI). The sequence of points of interest (PoI) generates secondary points of interest along a walking route parallel the walls of the floorplan covering the outline of the floorplan. The number of secondary points of interest and the distance interval are depending on the user walking speed and the trigger time period. This embodiments has the advantage that not clearly distinguishable points of interest of separate walk testing sequences in a walk testing project and appropriately displayed on screen. The user does not have to pay attention the automatically capture data and their representation on the display.

According to example embodiments, the displayed points of interest are displayed to indicate the corresponding RF data (i.e., the captured RF data 1:1 with the points of interest, or accumulated/bundled as described above). In this regard, a color and/or size of the displayed point of interest may be indicative of the captured RF data (e.g., a first color may indicate an RSRP value greater than a first predetermined threshold, a second color may indicate an RSRP value between the first predetermined threshold and a second predetermined threshold, etc.). Further, a user may toggle or select between different RF parameters (e.g., RSRP, RSSI, RSIQ, and SINR) such that the displayed points of interest are distinguished based on the corresponding values of the selected RF parameter.

According to example embodiments, a walk testing sequence of points of interest in an area map can be automatically obtained. Further, according to example embodiments, by considering a pixel resolution or a minimum distance interval for points of interest to be displayed, the displayed points of interest can be presented without overlap and easily distinguishable to a user. As a result, a walk testing in accordance with example embodiments can provide a more accurate testing as the number of points of interest is not limited by limitations of the display of the area map on a screen and limitations of the manual selection of points of interest in the area map on a screen.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the FIGS. In some alternative implementations, the functions noted in the blocks may occur out of the order noted in the FIGS. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. An apparatus for implementing an application for walk testing of radio network performance, the apparatus comprising:
    a display;
    a radio network transceiver interface;
    a memory storing instructions; and
    at least one processor configured to execute to the instructions to:
        based on a first input of a user to a first location on an area map displayed by the application, determine first coordinates of the first location on the area map and capture radio frequency (RF) data of a start point of interest, corresponding to the first location, for the walk testing along a walking path;
        subsequent to the capture of the RF data of the start point of interest, automatically capture RF data samples along the walking path;
        based on a second input of the user to a second location on the displayed area map, determine second coordinates of the second location on the area map and capture RF data of a stop point of interest, corresponding to the second location, for the walk testing along the walking path;
        determine a number of secondary points of interest, between the start point of interest and the stop point of interest for the walk testing, to be displayed on the area map and coordinates of the secondary points of interest to be displayed on the area map, based on a number of the automatically captured RF data samples and based on the determined first coordinates and the determined second coordinates;
        associate the automatically captured RF data samples with the secondary points of interest to be displayed, based on the determined number of the secondary points of interests to be displayed; and
        display, on the area map, the secondary points of interest at the determined coordinates of the secondary points of interest.

2. The apparatus of claim 1, wherein the at least one processor is further configured to execute to the instructions to:
    determine a total distance between the first coordinates and the second coordinates;
    determine a number of distance intervals between the first coordinates and the second coordinates based on the number of the automatically captured RF data samples;
    evaluate the determined total distance and the number of distance intervals based on a predetermined minimum distance interval between points of interest; and
    determine the number of secondary points of interest to be displayed and the coordinates of the secondary points of interest to be displayed based on the evaluating.

3. The apparatus of claim 2, wherein the at least one processor is further configured to execute to the instructions to evaluate the determined total distance and the number of distance intervals by:
    obtaining a quotient of the determined total distance and the number of determined distance intervals; and
    comparing the obtained quotient to the predetermined minimum distance interval.

4. The apparatus of claim 3, while the determining the number of secondary points of interest, the at least one processor is further configured to execute to the instructions to:
    determine that the number of secondary points of interest is equal to the number of automatically captured RF data samples based on the predetermined minimum distance interval being less than the obtained quotient, according to the comparing.

5. The apparatus of claim 3, wherein the at least one processor is further configured to execute to the instructions to:
    determine that the number of secondary points of interest is less than the number of automatically captured RF data samples based on the predetermined minimum distance interval being greater than or equal to the obtained quotient, according to the comparing.

6. The apparatus of claim 3, the at least one processor is further configured to execute to the instructions to:
    based on the predetermined minimum distance interval being greater than or equal to the obtained quotient, determine the number of secondary points of interest to be displayed to be equal to X−1, wherein X is an integer corresponding to a quotient of the determined total distance and the predetermined minimum distance interval.

7. The apparatus of claim 3, wherein based on the predetermined minimum distance interval being greater than or equal to the obtained quotient, the at least one processor is further configured to execute to the instructions to:
determine a distance between adjacent points of interest to be displayed; and
determine the coordinates of the secondary points of interest to be displayed according to the first coordinates, the second coordinates, and the determined distance between adjacent points of interest to be displayed.

8. The apparatus of claim 7, wherein the determined distance between the adjacent points of interest to be displayed is equal to:

$$Y+((Z-(X*Y))/X),$$

where X is an integer corresponding to a quotient of the determined total distance and the predetermined minimum distance interval, Y is the predetermined minimum distance interval, and Z is the determined total distance.

9. The apparatus of claim 1, wherein:
based on the determined number of the secondary points of interests to be displayed being less than the number of automatically captured RF data samples, the at least one processor is further configured to execute to the instructions to associate the automatically captured RF data samples with the secondary points of interest to be displayed by combining N number of successive automatically captured RF data samples to be associated with each of the secondary points of interest to be displayed; and
N is equal to an integer corresponding to a quotient of A and B, where A is the number of automatically captured RF data samples and B is equal to 1 plus the determined number of secondary points of interest to be displayed.

10. A method performed by at least one processor for implementing an application for walk testing of radio network performance, the method comprising:
based on a first input of a user to a first location on an area map displayed by the application, determining first coordinates of the first location on the area map and capturing RF data of a start point of interest, corresponding to the first location, for the walk testing along a walking path;
subsequent to the capture of the RF data of the start point of interest, automatically capturing RF data samples along the walking path;
based on a second input of the user to a second location on the displayed area map, determining second coordinates of the second location on the area map and capturing RF data of a stop point of interest, corresponding to the second location, for the walk testing along the walking path;
determining a number of secondary points of interest, between the start point of interest and the stop point of interest for the walk testing, to be displayed on the area map and coordinates of the secondary points of interest to be displayed on the area map based on a number of the automatically captured RF data samples and based on the determined first coordinates and the determined second coordinates;
associating the automatically captured RF data samples with the secondary points of interest to be displayed, based on the determined number of the secondary points of interests to be displayed; and
displaying, on the area map, the secondary points of interest at the determined coordinates of the secondary points of interests.

11. The method of claim 10, wherein the determining the number of secondary points of interest comprises:
determining a total distance between the first coordinates and the second coordinates;
determining a number of distance intervals between the first coordinates and the second coordinates based on the number of the automatically captured RF data samples;
evaluating the determined total distance and the number of distance intervals based on a predetermined minimum distance interval between points of interest; and
determining the number of secondary points of interest to be displayed and the coordinates of the secondary points of interest to be displayed based on the evaluating.

12. The method of claim 11, wherein the evaluating comprises:
obtaining a quotient of the determined total distance and the number of determined distance intervals; and
comparing the obtained quotient to the predetermined minimum distance interval.

13. The method of claim 12, wherein the determining the number of secondary points of interest comprises:
determining that the number of secondary points of interest is equal to the number of automatically captured RF data samples based on the predetermined minimum distance interval being less than the obtained quotient, according to the comparing.

14. The method of claim 12, wherein the determining the number of secondary points of interest comprises:
determining that the number of secondary points of interest is less than the number of automatically captured RF data samples based on the predetermined minimum distance interval being greater than or equal to the obtained quotient, according to the comparing.

15. The method of claim 12, wherein the determining the number of secondary points of interest to be displayed based on the evaluating comprises:
based on the predetermined minimum distance interval being greater than or equal to the obtained quotient, determining the number of secondary points of interest to be displayed to be equal to X−1, wherein X is an integer corresponding to a quotient of the determined total distance and the predetermined minimum distance interval.

16. The method of claim 12, wherein the determining the coordinates of the secondary points of interest to be displayed comprises, based on the predetermined minimum distance interval being greater than or equal to the obtained quotient:
determining a distance between adjacent points of interest to be displayed; and
determining the coordinates of the secondary points of interest to be displayed according to the first coordinates, the second coordinates, and the determined distance between adjacent points of interest to be displayed.

17. The method of claim 16, wherein the determined distance between the adjacent points of interest to be displayed is equal to:

$Y+((Z-(X*Y))/X)$, where X is an integer corresponding to a quotient of the determined total distance and the predetermined minimum distance interval, Y is the predetermined minimum distance interval, and Z is the determined total distance.

18. The method of claim 10, wherein:

the associating the automatically captured RF data samples with the secondary points of interest to be displayed comprises, based on the determined number of the secondary points of interests to be displayed being less than the number of automatically captured RF data samples, combining N number of successive automatically captured RF data samples to be associated with each of the secondary points of interest to be displayed; and N is equal to an integer corresponding to a quotient of A and B, where A is the number of automatically captured RF data samples and B is equal to 1 plus the determined number of secondary points of interest to be displayed.

19. A non-transitory computer readable recording medium having recorded thereon instructions executable by at least one processor to perform a method for performing a walk testing, the method comprising:

based on a first input of a user to a first location on an area map displayed by the application, determining first coordinates of the first location on the area map and capturing RF data of a start point of interest, corresponding to the first location, for the walk testing along a walking path;

subsequent to the capture of the RF data of the start point of interest, automatically capturing RF data samples along the walking path;

based on a second input of the user to a second location on the displayed area map, determining second coordinates of the second location on the area map and capturing RF data of a stop point of interest, corresponding to the second location, for the walk testing along the walking path;

determining a number of secondary points of interest, between the start point of interest and the stop point of interest for the walk testing, to be displayed on the area map and coordinates of the secondary points of interest to be displayed on the area map, based on a number of the automatically captured RF data samples and based on the determined first coordinates and the determined second coordinates;

associating the automatically captured RF data samples with the secondary points of interest to be displayed, based on the determined number of the secondary points of interests to be displayed; and displaying, on the area map, the secondary points of interest at the determined coordinates of the secondary points of interest.

* * * * *